April 28, 1936. L. SEMAR 2,039,120
TACKLE FOR RELEASABLE SINKERS
Filed April 11, 1935
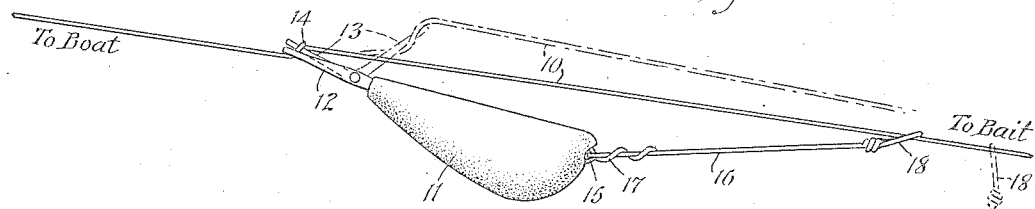
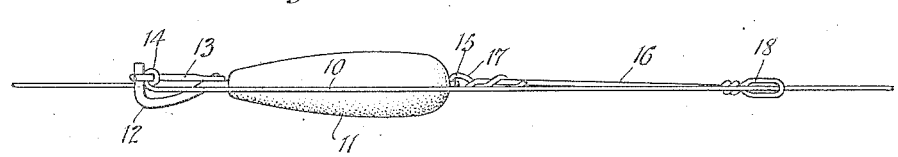
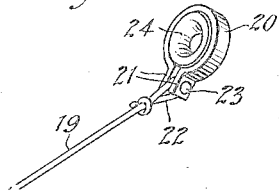
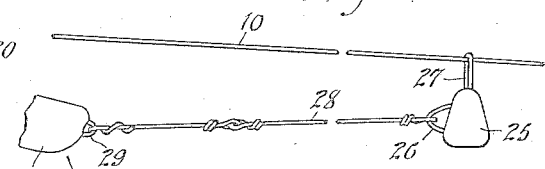
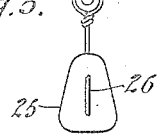
WITNESSES
Edw. Thorpe
Chris Feinle.
INVENTOR
Louis Semar
BY
Munn, Anderson & Liddy
ATTORNEYS Patented Apr. 28, 1936

2,039,120

UNITED STATES PATENT OFFICE 2,039,120

TACKLE FOR RELEASABLE SINKERS

Louis Semar, Anacortes, Wash.

Application April 11, 1935, Serial No. 15,883

8 Claims. (Cl. 43—28)

This invention relates to means useful in conjunction with a releasable sinker and fishing line to which the sinker is releasably attached.

More particularly, the invention relates to means useful in conjunction with a sinker of the character as described in Letters Patent of the United States No 1,943,192, granted to me January 9, 1934.

The sinker has means for releasably attaching it in fixed position to a fishing line, and which will be released from the fixed position by a pull on the free end of the line, such as by the pull by a fish taking the baited hook. This makes it possible to employ means of the present invention to slide the released sinker along the fishing line toward the hook, or means to carry a part of the weight of the sinker and to draw the released sinker into a boat free from the fishing line. Therefore, in trolling for fish with a pole, reel and line, the line may be reeled in as near as possible to the hook in order to prevent thrashing of the fish on the hook, and to afford an opportunity to lift the fish into the boat by means of a hand seine or to gaff the fish. It is also possible to prevent the unintentional release of the releasable sinker in the event the hook catches on drift or sea weed, and also makes it possible to use heavy sinkers while fishing with light tackle.

The principal object of the invention is the provision of improved means to attain the above-mentioned advantages.

With the foregoing other objects of the invention will appear from the embodiments thereof described in the following specification and illustrated in the accompanying drawing, in which:

Fig. 1 is a view of a fishing line and a releasable sinker and trolley shown in fixed position in full lines and in released position in dot and dash lines;

Fig. 2 is a top view of the arrangement shown in Fig. 1;

Fig. 3 is a view of one end of a modified form of trolley;

Fig. 4 is a view of a further modified form of trolley in use;

Fig. 5 is a side view of a further modified form of trolley; and

Fig. 6 is a view of a fishing line and releasable sinker in fixed position under control of a weighted drag line.

In Figs. 1 and 2 there is illustrated one form of the invention, in which there is shown a portion of a fishing line 10 and a releasable sinker 11. The sinker 11 has means on one end for releasably attaching it in fixed position to the line 10. The said means consists of a hook 12 and a toggle member 13 pivoted to the shank of the hook 12. The line 10 is looped as at 14 about the outer end of the member 13. When the line 10 is drawn tight with the outer end of the number 13 against the hook 12, the sinker 11 will be attached in fixed position to the line 10, subject to a pull on the free end of the line, as when a fish takes the hook. The sinker 11 has a loop 15. Use is made of a device for sliding the sinker 11 along the line 10 after the sinker is released in the manner stated. The device consists of a piece of wire 16 of suitable length having a loop 17 on one end and a guide loop 18 on its opposite end. The loop 17 is engaged with the loop 15 on the sinker 11, and the loop 18 is engaged with the line 10. Upon release of the sinker 11 by the disengagement of the line 10 with the member 13, the sinker 11 will drop downwardly away from the line 10 suspended on the wire 16 which acts as a leash to retain the sinker 11 on the line, and at the same time serves as a trolley, to slide the sinker 11 along the line 10 to a point thereon near the hook on the free end of the line 10. The line 10 may then be reeled in close to the hook to make landing of the hooked fish an easy matter. By releasing the sinker 11 and sliding the same along the line 10 in the manner stated, there is less liability of the line 10 being torn when a fish is hooked.

The device for leashing and sliding the sinker may be diversely formulated. As shown in Fig. 3 the device consists of a connecting member 19 of wire, a portion thereof being shown, and an open loop 20 having terminals 21 spaced with relation to each other. The member 19 has a loop 22 which is disposed between the terminals 21 and a pivot pin 23 extends through the terminals 21 and the loop 22. The loop 20 is thus pivotally connected with the member 19. An agate eye 24 is held in place in the loop 20. The fishing line 10 extends through the eye 24 when the device is in use.

In Fig. 4 there is shown a further modified form of device for leashing and sliding the releasable sinker 11. This device consists of a weight 25 having a connecting loop 26 which projects from one side thereof and a guiding loop 27 projecting from the top of the weight. The device also includes a pivotally jointed connecting member 28 made of sections of wire or a piece of line of suitable length, one end of said member being pivotally connected with the loop 26 and its opposite end being pivotally connected with means on the sinker 11 in the form of a loop or eye 29. If desired the weight 25 may be provided with an agate guiding eye 30 in lieu of the loop 27 as shown in Fig. 5.

In Fig. 6 there is shown a further modified form of invention in which use is made of a line 31 having one end thereof connected with the releasable sinker 11 as at 32, and the other end is attached to the boat. If desired a separate sinker or weight 33 may be arranged on the line 31. With this form of tackle if the fish hook catches on drift or sea weed, the fishing line 10 will not be disengaged from the sinker 11, unless the drag is great enough to pull the sinker 11 down and straight behind the sinker 33. The length of line between the sinker 11 and the sinker 33 will gauge the extent the drag will have to be in order to release the line 10. As shown in Fig. 6, there is considerable slack in the line 10 while trolling with a heavy sinker on the line 31, the tension in trolling being on the line 31, thereby relieving the tension on that portion of the line 10 above the sinker 11. The drag on the line 10 below the sinker 11 will not cause the release of the sinker 11 as long as the boat is under headway. This is true regardless of the amount of slack in the line 10. The sinker 11 will be released by a pull exerted by a fish taking the hook. After the hooked fish is reeled in and removed from the hook, both sinkers 11 and 33 may be drawn in with the line 31.

What I claim is:

1. A device for sliding a releasable sinker along a fishing line upon release of the sinker, consisting of a guide member slidable on said line, and a connecting member having one end pivotally connected with the guide member and the opposite end having means engageable with suitable means on the sinker.

2. A device for sliding a releasable sinker along a fishing line upon release of the sinker, consisting of a length of wire having a loop formed on each end thereof, and an agate eye held in place in the loop on one end of the wire which is slidable on said line, the loop on the other end of the wire being engageable with suitable means on the sinker.

3. A device for sliding a releasable sinker along a fishing line upon release of the sinker, consisting of a loop member formed to provide spaced lugs, an eye member held in place in the loop member slidable on said line, and a connecting member constructed of a length of wire having one end pivotally connected with said lugs, and the opposite end having means engageable with suitable means on the sinker.

4. A device for sliding a releasable sinker along a fishing line upon release of the sinker, consisting of a weight having means slidable on said line, and also having a loop, and a connecting member having one end pivotally connected with said loop, and the opposite end of said member having means for pivotal connection with suitable means on said sinker.

5. A device for sliding a releasable sinker along a fishing line upon release of the sinker, consisting of a weight having a loop slidable on said line, and also having a second loop projecting at an angle to the first loop, and a connecting member having one end pivotally connected with the second loop, and the opposite end of said member having means for pivotal connection with suitable means on said sinker.

6. A device for sliding a releasable sinker along a fishing line upon release of the sinker, consisting of a weight having means slidable on said line, and also having a loop, and a pivotally jointed connecting member constructed of wire having one end pivotally connected with said loop, and the opposite end of said member having means for pivotal connection with suitable means on said sinker.

7. The combination with a fishing line, of a sinker, means on the sinker to releasably connect it with said line, and a drag line having one end connected with said sinker to haul it in when released from the fishing line.

8. The combination with a fishing line, of a sinker, means on the sinker to releasably connect it with said line, a drag line having one end connected with said sinker to haul it in when released from the fishing line, and a sinker on the drag line for weighting the same.

LOUIS SEMAR.